(12) United States Patent
Tommesani

(10) Patent No.: US 10,710,822 B2
(45) Date of Patent: Jul. 14, 2020

(54) GRIPPING MEMBER AND TELESCOPIC VACUUM CHAMPER FOR GRIPPING A LAYER OF PRODUCTS

(71) Applicant: OCME S.R.L., Parma (IT)

(72) Inventor: Marco Tommesani, Parma (IT)

(73) Assignee: OCME S.R.L., Parma (IT)

( * ) Notice: Subject to any disclaimer, the term of this patent is extended or adjusted under 35 U.S.C. 154(b) by 8 days.

(21) Appl. No.: 16/127,610

(22) Filed: Sep. 11, 2018

(65) Prior Publication Data
US 2019/0077615 A1 Mar. 14, 2019

(30) Foreign Application Priority Data

Sep. 11, 2017 (IT) .......................... 102017000101371

(51) Int. Cl.
*B65G 47/04* (2006.01)
*B65G 57/24* (2006.01)
(Continued)

(52) U.S. Cl.
CPC ............. *B65G 57/04* (2013.01); *B65G 57/24* (2013.01); *B65G 59/02* (2013.01); *B65G 59/04* (2013.01)

(58) Field of Classification Search
CPC ........ B65G 47/90; B65G 47/91; B65G 57/24; B65G 59/04; B65G 61/00; B65G 2201/02;
(Continued)

(56) References Cited

U.S. PATENT DOCUMENTS 2,598,222 A * 5/1952 Cahners ................. B65G 57/24
414/789.9
3,404,787 A * 10/1968 Hayford .................. B66C 1/025
414/796
(Continued)

FOREIGN PATENT DOCUMENTS

DE 19814365 A1 * 10/1998 ............. B65G 47/90
DE 10102929 A1 * 8/2002 .......... B25J 15/0253
(Continued)

OTHER PUBLICATIONS

Italian Search Report for Application No. IT201700101371, dated May 15, 2018 in 2 pages.

*Primary Examiner* — Gregory W Adams
(74) *Attorney, Agent, or Firm* — Knobbe, Martens, Olson & Bear, LLP

(57) ABSTRACT

A gripping member for gripping a layer of products includes an upper closed wall, a suction plane associated on the lower side of the upper wall, mechanical gripping elements, a lower safety support plane, movable between an open position of disengagement from the gripping area and a closed position at least partially in engagement with the gripping area, and a telescopic chamber, open only toward the bottom. The telescopic chamber is fastenable around the product layer and is connectable to means for generating depression or vacuum, for pneumatically lifting the product layer by means of depression. The telescopic chamber includes a peripheral continuous gripping ring arranged at the periphery of the upper wall and consists of four angular elements and at least four plate-like side elements, which are slidably arranged with respect to the angular elements. The upper wall has adjustable plane dimensions.

11 Claims, 6 Drawing Sheets

(51) Int. Cl.
*B65G 57/04* (2006.01)
*B65G 59/04* (2006.01)
*B65G 59/02* (2006.01)

(58) Field of Classification Search
CPC .. B66C 1/0218; B25J 15/0616; B65D 21/086; E04H 12/185
See application file for complete search history.

(56) References Cited

U.S. PATENT DOCUMENTS

| | | | | |
|---|---|---|---|---|
| 4,061,084 | A * | 12/1977 | Bakkeren | B65H 31/00 100/1 |
| 5,088,878 | A * | 2/1992 | Focke | B65G 47/91 294/188 |
| 6,802,688 | B1 * | 10/2004 | Andersen | B65G 47/90 294/188 |
| 7,481,472 | B2 * | 1/2009 | Cawley | B65G 47/91 294/2 |
| 2006/0242785 | A1 | 11/2006 | Cawley et al. | |
| 2012/0045309 | A1 * | 2/2012 | Christensen | B65G 47/90 414/793 |
| 2013/0015675 | A1 * | 1/2013 | Pickard | B65G 59/02 294/24 |
| 2013/0177380 | A1 * | 7/2013 | Murarotto | B65G 47/90 414/796.2 |

FOREIGN PATENT DOCUMENTS

| | | | | |
|---|---|---|---|---|
| EP | 1921029 | A2 | 5/2008 | |
| EP | 2593387 | A1 | 5/2013 | |
| WO | WO-9602444 | A1 * | 2/1996 | ........... B65G 1/0485 |
| WO | WO-2011135031 | A1 * | 11/2011 | ............. B65G 47/91 |

\* cited by examiner

US 10,710,822 B2

GRIPPING MEMBER AND TELESCOPIC VACUUM CHAMPER FOR GRIPPING A LAYER OF PRODUCTS

CROSS-REFERENCE TO RELATED APPLICATION

This application claims priority to Italian Patent Application No. 102017000101371 filed on Sep. 11, 2017, the disclosure of which including the specification, the drawings, and the claims is hereby incorporated by reference in its entirety.

FIELD OF THE INVENTION

The present invention relates to a gripping member of a layer of products.

BACKGROUND OF THE INVENTION

For the depalletization of product layers, that is to say, for picking up a layer of products from stacks of layers placed on pallets, it is known to use layer grippers which operate on the principle of suction or vacuum creation. These grippers are provided with side bars at the four sides, which close on the four sides of the product layer, thus tightening and stabilizing it. The gripper has vacuum generating means, adjustable in height for adjusting to the height of the products forming the layer.

DE 4206038 A1 shows an example of such a depalletizing gripper, in which the vacuum generating gripping means are, for example, a suction plate of the suction cup type, and also comprising a lower shutter support surface, which closes for greater safety under the layer after it has been lifted and before its handling.

Another example is given by document US 2010/0014954 A1, which shows a gripper, provided with a lower shutter support surface, which can be provided with side bars only, which close on the four sides of the product layer, thus tightening it, or also vacuum generating gripping means, consisting of a suction plate.

Other known vacuum generating means may consist of a plate-like element, preferably grid-like, which rests onto the product layer and the height whereof is adjusted according to the height of the products being processed. Through the plate-like element a vacuum with a low head but a high flow rate is made for lifting the product layer. Between this plate-like element and the side bars there are flexible curtain elements which, when the vacuum is made in the plate-like element, tend to adhere to the side walls of the product layer, thus increasing the degree of vacuum as they reduce air leakage on the side of the product. In practice, a sort of vacuum bell is generated around the product layer which is efficient for lifting the product layer even in the presence of products difficult to handle with normal suction cups, such as for example PET bottle bundles.

Document WO 00/64790 A1 shows such a gripper in which on each of the four sides, the side bars consist of inflatable elements placed between a fixed frame and flexible peripheral curtains. The side bars act in particular on such flexible curtains so as to exert pressure on the sides of the product layer.

Similarly, document EP 2593387 A1 shows a similar gripper in which the side bars consist of pressure elements, which push flexible curtain peripheral elements in contact with the side walls of the products forming a layer. A lower shutter support surface associated with the gripper support frame closes for greater safety under the layer after it has been lifted and before its handling.

However, the flexible curtain elements arranged on the perimeter of the gripper have some technical drawbacks, including in particular the reduced tolerance on the minimum or maximum dimensions of the layer, in plan and/or height. In fact, the flexible curtain elements cannot be excessively extended as they would form too many wrinkles at the corners for very small layers, but they must still be sufficiently large to cover the layer of products.

Moreover, they are subject to a more accentuated wear compared to the other mechanical components of the gripper, intrinsically linked to their flexible nature and to being subjected, during repeated clamping cycles of the gripper, to bending, pulling and repeated folds, especially in the corners where the pull on the curtain is not uniform and especially if the size of the layer is far from the expected size. They therefore require dedicated maintenance to maintain constant efficiency over time.

Flexible curtain elements also require the provision of ropes or winders or tensioners to keep them in position, which represent elements of system fragility.

SUMMARY OF THE INVENTION

The object of the present invention is to provide a gripping member for a layer of products capable of solving the technical problems described above.

Another object of the present invention is to provide a gripping member of a layer of products that is particularly simple and functional and particularly resistant to wear.

These objects according to the present invention are achieved by providing a gripping member for gripping a layer of products as described in claim 1.

Further characteristics are described in the dependent claims.

BRIEF DESCRIPTION OF THE DRAWINGS

The characteristics and the advantages of a gripping member for gripping a layer of products according to the present invention will become apparent from the following exemplary and non-limiting description, made with reference to the accompanying schematic drawings, in which.

DETAILED DESCRIPTION OF THE PREFERRED EMBODIMENTS

Figure 1:
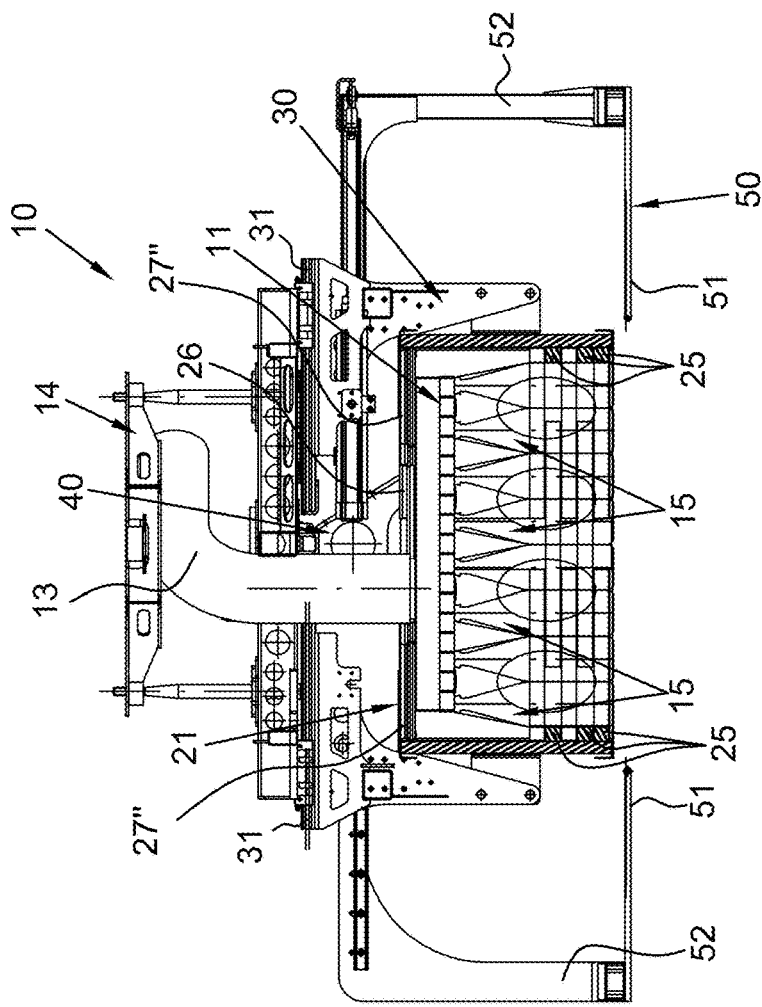
FIGS. 1 and 2 are sectional views, respectively, of a gripping member of a layer of products according to the invention, in which the lower safety support plane is in closed and open configuration, respectively.
Figure 2:
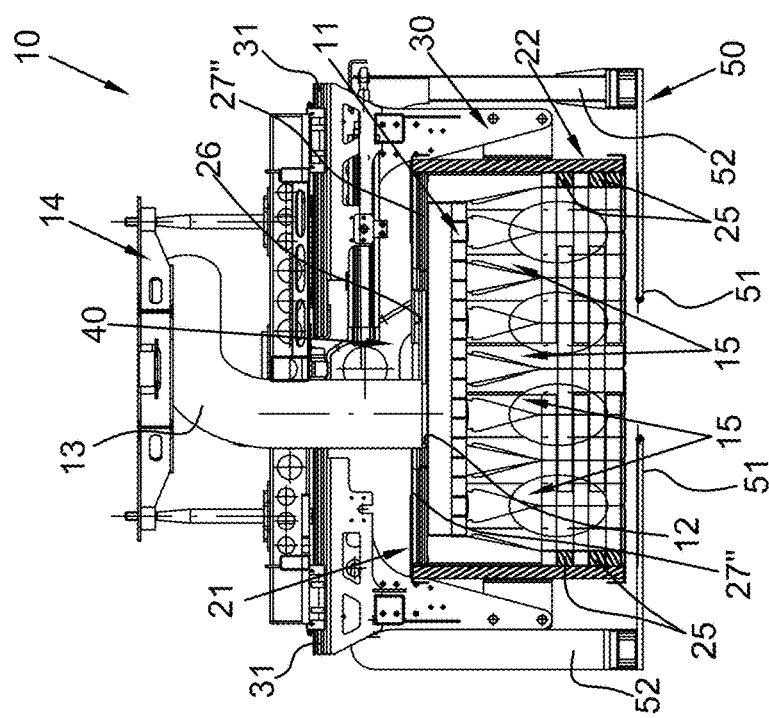
Figure 3:
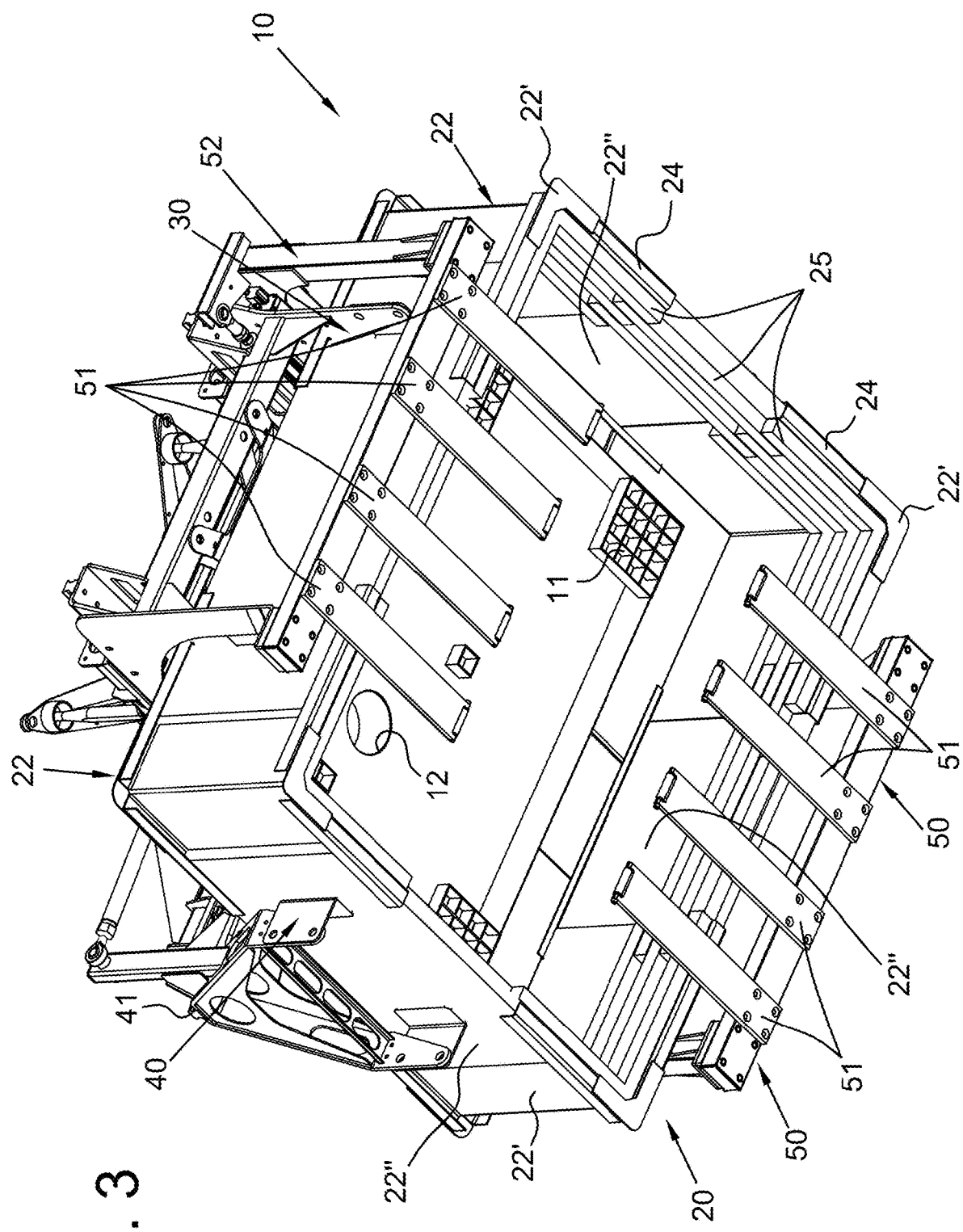
FIG. 3 is a perspective bottom view of the partially cutaway gripping member in the maximum closing position.
Figure 4:
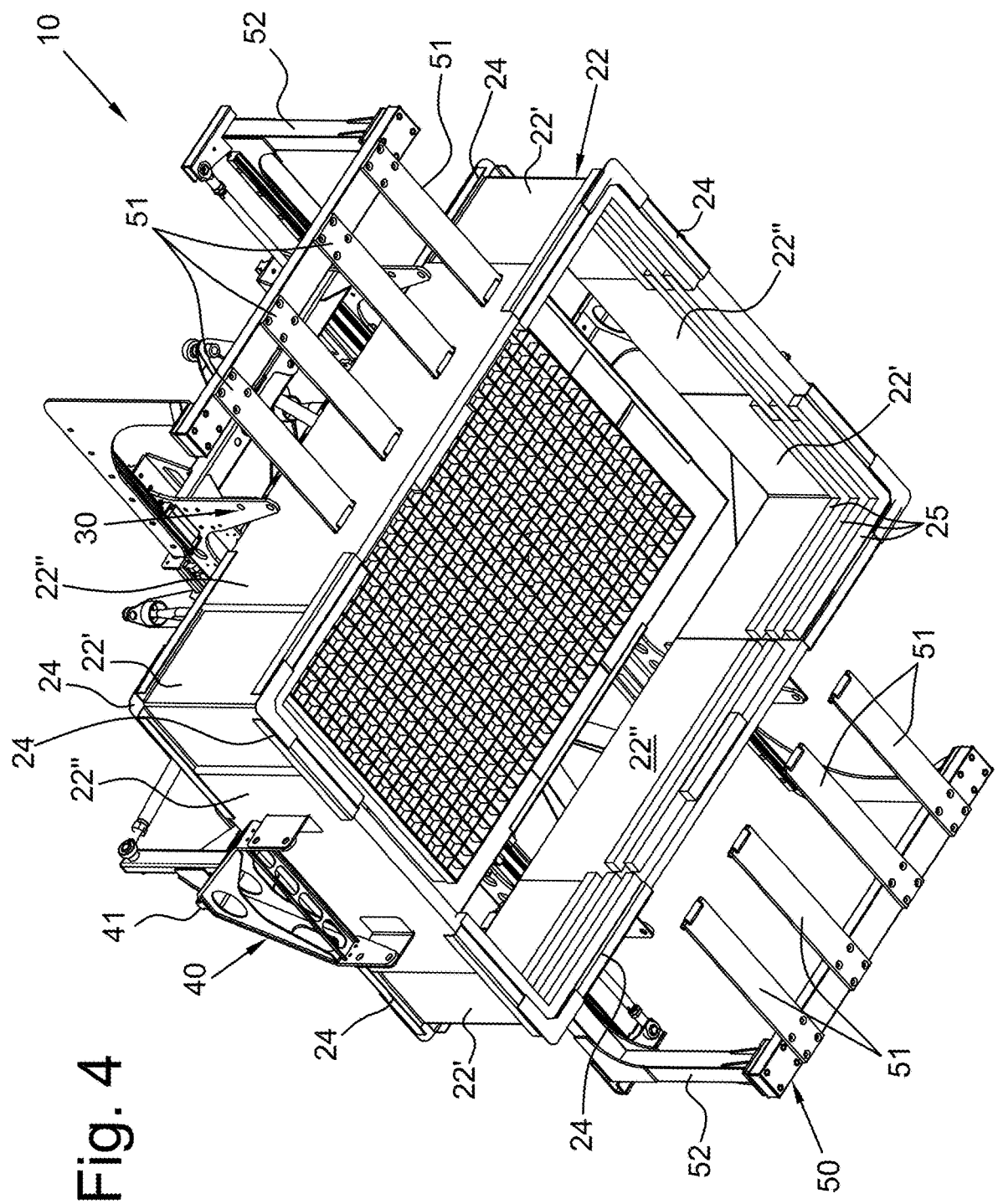
FIG. 4 is a perspective bottom view of the partially cutaway gripping member in extra-stroke conditions of the peripheral ring.
Figure 5:
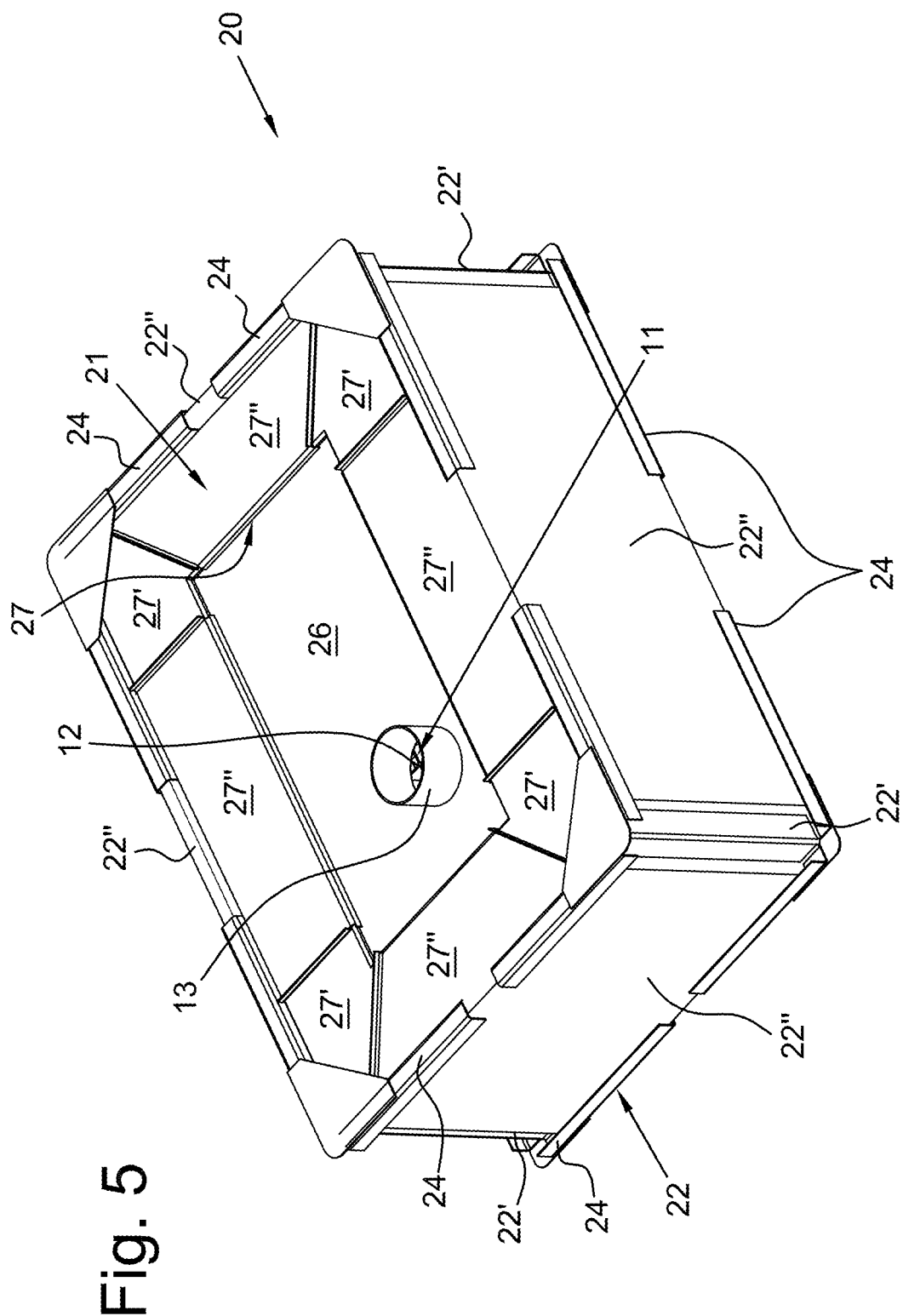
FIGS. 5 and 6 are perspective views from above of the telescopic chamber of the gripping member, in closed and open conditions, respectively.
Figure 6:
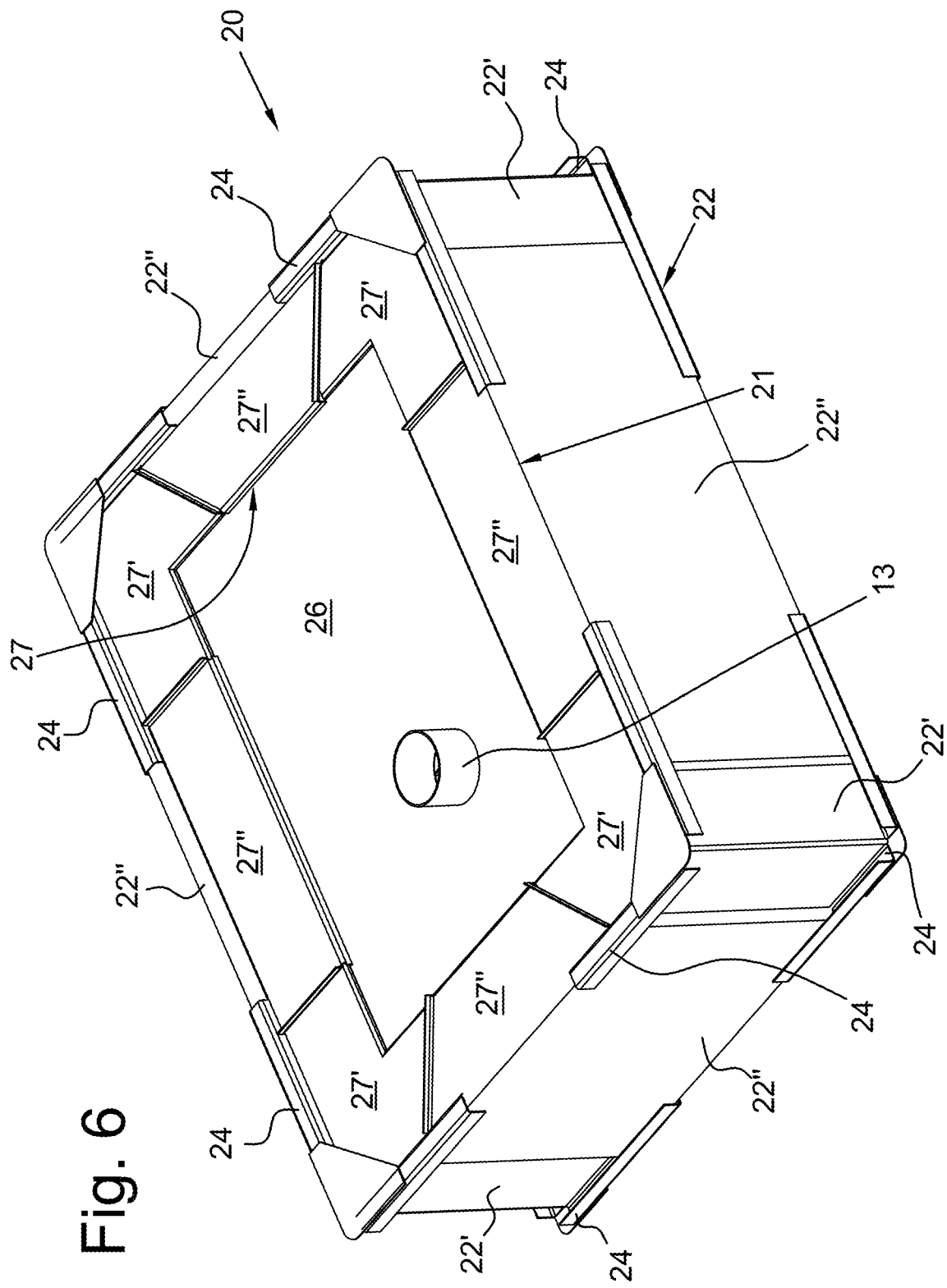
Figure 7:
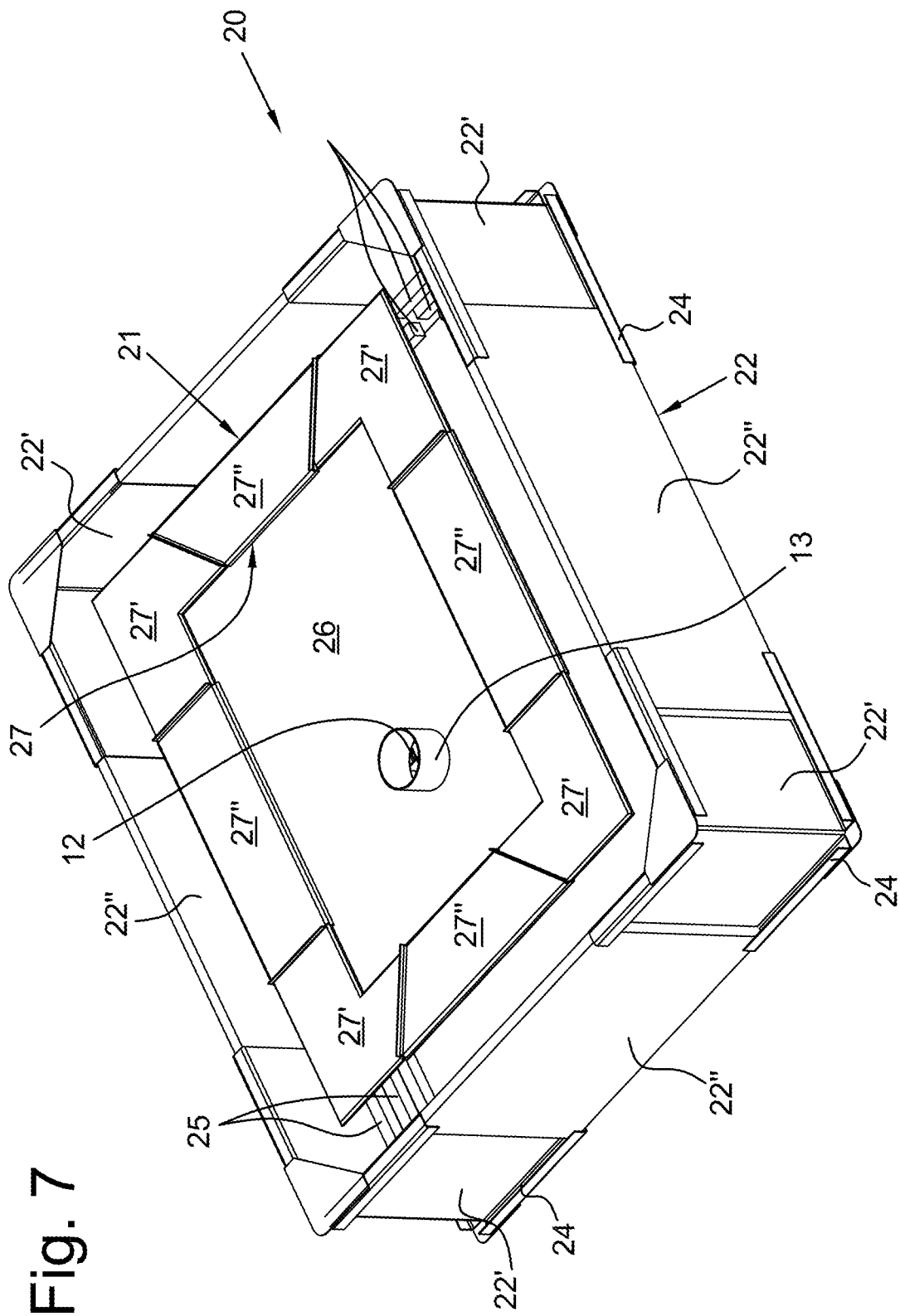
FIG. 7 shows the chamber of FIG. 6 in the conditions of extra stroke of the peripheral ring.

With reference to the figures, a gripping member of a layer of products is shown, generally indicated with reference numeral 10 and comprising a telescopic chamber 20, open only downwards for the mechanical peripheral grip on five sides around a product layer, for example consisting of bundles of PET bottles 15, in which inside the telescopic chamber 20 a vacuum is generated, adapted to help the lifting of the product layer.

The gripping member 10 also comprises an associated suction plate 11 on the lower side of the upper wall 21 of the telescopic chamber 20. The suction plane 11 is adjustable in height within the telescopic chamber 20 and identifies a gripping area by means of a vacuum. The height adjustment allows adaptation to the dimensions of the product layer to be picked, which must preferably be at least entirely contained in height within the telescopic chamber 20.

The suction plane 11 preferably consists of a grating which allows the passage of air therein. The air is suctioned through an opening 12 formed in the upper wall 21 of the telescopic chamber 20 by a lateral channel impeller, of a known type and not the object of the present invention with a low head but a high flow rate. In the figures, the vacuum generation means are shown schematically through a conduit 13.

The telescopic chamber 20 comprises, in addition to the closed upper wall 21, a peripheral ring 22 consisting of four angular elements 22' and at least four plate-like side elements 22", mutually slidably arranged at the perimeter of the upper wall 21. It follows that, according to the invention, mechanical gripping elements, movable and associable to the sides of the product layer to be picked, are connected to each other to form the peripheral continuous gripping ring 22.

It is to be understood that each of the side plate-like elements 22", according to the invention, may consist of two or more plates mutually sliding.

The sliding coupling between the side plate-like elements 22" and the angular elements 22' is provided by linear guides 24, which in the example are shown arranged externally with respect to the telescopic chamber 20 on both sides of the angular elements 22' along the upper and lower edges to slidably accommodate the plate-like side elements 22" above the angular elements 22'.

Inside the telescopic chamber 20, friction elements 25 are arranged, preferably rubberized to improve the mechanical and pneumatic grip on the product layer.

This allows opening and closing the peripheral ring 22, which maintains in all its configurations a structural continuity to ensure the lateral mechanical and pneumatic tightening on the product layer. In fact, in addition to exerting the grip on the product, the air is prevented from being suctioned by the side walls of the layer but only through the lower part.

The angular elements 22' and the side plate-like elements 22" are arranged orthogonal or otherwise inclined with respect to the upper wall 21 of the telescopic chamber 20 and in grip configuration they are placed in sealed contact therewith.

The upper wall of the telescopic chamber 20 is, according to the invention, of adjustable flat dimensions between a minimum size, corresponding to the suction plane 11, and a maximum dimension corresponding to the maximum dimension of the product layer to be picked.

The upper wall 21 of the telescopic chamber 20 comprises a plurality of flat plate-like elements, which mutually slide, adapting the size of the upper wall 21 to the side containment and which can be associated with a pneumatic seal to upper edges of the peripheral ring 22 for sealing the upper part of the telescopic chamber 20.

In the example shown, the upper wall 21 comprises a central plate 26 and a frame 27 consisting of upper angular 27' and straight 27" connecting sheets slidably coupled with each other. Linear guides, which guide the movement of the plate-like elements of the upper wall 21 and actuators which return such elements to the limit switch open position, of known type, have not been shown for simplicity of representation.

According to a preferred embodiment of the invention, the side plate-like elements 22" may be separated and spaced from the frame 27 of the upper wall 21 of the telescopic chamber 20 and are provided with an opening stroke in a horizontal direction greater than that of the frame 27 of the upper wall 21. This extra stroke of the peripheral ring 22 with respect to the vacuum gripping area allows a greater margin of safety in inserting next to the product layer to be picked to then close hermetically only after the actuator means have carried out an initial horizontal approach stroke on the product layer.

By horizontal direction it is meant a direction parallel to the plane in which the product layer to be picked lies.

The gripping member 10 further comprises a support structure 14 for connecting the telescopic chamber 20 to a device for moving the gripping member, such as for example an anthropomorphic arm or robot, not shown, capable of moving the gripping member 10 in space. The means for the bidirectional movement of the side plate-like elements 22" are also connected to the support structure 14 and comprise a first pair 30 and a second pair 40 of motorized boards, movable horizontally in mutually orthogonal directions along respective linear guides 31 and 41, placed between the respective boards and the support structure 14. In the example, each of the pairs of boards 30, 40 is driven by its own brushless motor, not shown, capable of imparting a symmetrical bidirectional movement, that is to say self-centering, with respect to the centre of the gripping member 10, through a suitable kinematic mechanism. According to the invention, each of the two pairs of boards 30, 40 may be controlled independently of the other.

Each pair of boards 30, 40 is directly connected to the side plate-like elements 22" arranged on opposite sides of the telescopic chamber 20. The boards, which in the example have a fork shape, therefore have the dual function of supporting the telescopic chamber 20 and moving it in opening and closing in the plane of the layer.

According to the invention, the gripping member 10 also comprises a lower safety support plane 50, movable between an open position of disengagement from the gripping area and a closed position at least partially in engagement with the gripping area, and divided into two rigid plane portions 51 horizontally translatable. The two plane portions 51, which in the example consist of a plurality of parallel brackets, are directly connected to the first pair of boards 30 by supporting elements 52, controlled for example by their own motors or by pneumatic actuators, provided with bidirectional movement symmetrical with respect to the centre of the gripping member 10 for the insertion under the product layer picked by vacuum and the outlet with respect to the gripping area.

This movement, parallel to the movement of the pair of boards 30 to which they are connected, can be actuated independently of the movement of the boards. This allows reducing the stroke of the plane portions 51 to the minimum necessary, and does not require the construction of bulky structures outside the gripping member 10, as is the case for traditional shutter-type planes.

The upper surface of the plane portions 51 and the lower part of the side plate-like elements 22" are spaced, for example by a few centimetres, to allow the support plane 50 to close without risk of interfering with the product layer kept suspended within the telescopic chamber 20 by vacuum.

Moreover, in order to achieve a hermetic seal of the telescopic chamber 20, the side plate-like elements 22" and the angular elements 22' have a height greater than the maximum height of the product forming the layer.

Advantageously, in the gripping member 10 according to the invention, in the open position of the lower support plane 50, i.e. in which the two plane portions 51 are disengaged from the gripping area, the gripping member 10 has encumbrance elements placed in the planes underneath the telescopic chamber 20 only along two opposite sides of the telescopic chamber 20. It follows that, in open conditions of the lower support plane 50, with or without the presence of a product layer received within the telescopic chamber 20, the approach movement of the gripping member 10 to a deposition plane of a layer picked or to a layer to be picked, can take place with reduced tolerance on the overall dimensions.

The gripping member according to the invention is particularly advantageous in the presence of stacks of product layers separated from each other by a cardboard flap, in cases in which the layer of product picked must be deposited without flap and therefore the flap removal is necessary.

In fact, due to the absence of encumbrance elements in the planes below the telescopic chamber 20 along two opposite sides of the telescopic chamber 20 itself, it is possible to drag the layer on a support surface, for example for removing the flap In fact, when a product layer is picked with the gripping member 10 object of the invention, if there is a flap below the picked layer, this flap is removed due to the vacuum generated in the suction plane 11. Moreover, this flap allows improving the degree of vacuum inside the telescopic chamber 20, thus reducing the air leakage due to the distance between the various products present in the layer.

The gripping member of a layer of products, according to the present invention, has the advantage of obtaining a vacuum chamber adaptable from time to time to the dimensions of the layer to be picked and having reduced wear.

The gripping member according to the invention is provided with good flexibility on the dimensions of the layer to be removed and of a possible underlying cardboard flap.

Advantageously, it provides an optimal mechanical peripheral stabilization of the product layer.

Advantageously, during the insertion on the layer, the walls of the peripheral ring are provided with an extra stroke in opening with respect to the gripping area to allow a grip of the layer with less stringent positioning tolerance compared to traditional grippers.

The gripping member of a layer of products thus conceived is susceptible to many modifications and variations, all falling within the invention; furthermore, all the details are replaceable by technically equivalent elements. In practice, the materials used, as well as their dimensions, may be any according to the technical requirements.

What is claimed is:

1. A gripping member for gripping a layer of products comprising:
    an upper closed wall;
    a suction plane associated on a lower side of the upper wall, which is adjustable in height and identifies an area for vacuum gripping;
    mechanical grips, which can be moved and associated with the sides of the layer of products to be picked up, wherein said mechanical grips are connected each other to form a peripheral continuous gripping ring;
    a lower safety support plane, movable between an open position of disengagement from the gripping area and a closed position at least partially in engagement with the gripping area; and
    a telescopic chamber, open only toward the bottom, said telescopic chamber being fastenable around the product layer for lifting the product layer through a peripheral one of said mechanical grips and being connectable to means for generating depression or vacuum, for pneumatically lifting the product layer by means of depression,
    wherein said telescopic chamber comprises the peripheral continuous gripping ring arranged at the periphery of the upper wall and consisting of four angular elements and at least four plate-like side elements, which are slidably arranged with respect to said angular elements, said upper wall being of plane dimensions adjustable between a minimum dimension, corresponding to the suction plane, and a maximum dimension, corresponding to the maximum dimension of the layer to be picked up.

2. The gripping member according to claim 1, wherein said angular elements and said plate-like side elements are arranged orthogonal or otherwise inclined with respect to the upper wall and preferably have a height greater than the maximum height of the product forming the layer to be picked up.

3. The gripping member according to claim 1, wherein linear guides are arranged externally with respect to the telescopic chamber on both sides of the angular elements along the upper and lower edges to slidably accommodate the plate-like side elements above the angular elements.

4. The gripping member according to claim 1, wherein friction elements are arranged within the telescopic chamber and are disposed on the peripheral continuous gripping ring.

5. The gripping member according to claim 4, wherein the friction elements are rubberized.

6. The gripping member according to claim 1, wherein said upper wall comprises a plurality of plane slab-like elements slidable with respect to each other that can be associated by pneumatic seal with upper edges of the peripheral ring for sealing the upper part of the telescopic chamber.

7. The gripping member according to claim 6, wherein said plurality of plane slab-like elements comprises a central plate and a frame, which consists of upper angular and straight connecting sheets, which are slidably coupled with each other.

8. The gripping member according to claim 7, wherein said plate-like side elements and said angular elements are moveable away from the frame of the upper wall through an opening stroke in a horizontal direction in the plane of the major layer.

9. The gripping member according to claim 1, wherein said plate-like side elements, arranged in pairs on opposite sides of the chamber, are directly constrained to an own pair of motorized boards, each of the two pairs of boards being moved along linear guides with a bidirectional movement in the gripping plane and symmetrical with respect to the centre of the gripping member.

10. The gripping member according to claim 9, wherein said linear guides are placed between the respective pairs of boards and a support structure of the telescopic chamber, that can be connected to a device for moving the gripping member in space.

11. The gripping member according to claim 1, wherein said lower support plane comprises two plane portions that are rigid and horizontally translatable, said plane portions being directly connected to a first one of the pairs of boards by means of support elements having a bidirectional movement symmetrical with respect to the centre of the gripping member.

* * * * *